No. 864,110. PATENTED AUG. 20, 1907.
E. SCHUYLER & J. A. HYLE.
VEHICLE WHEEL.
APPLICATION FILED MAY 14, 1906.
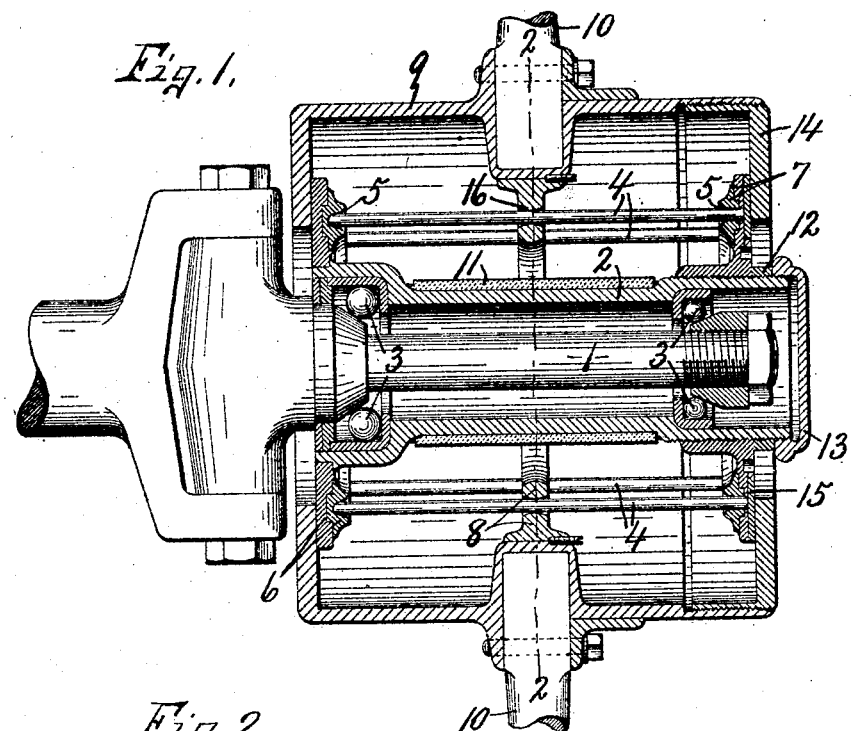
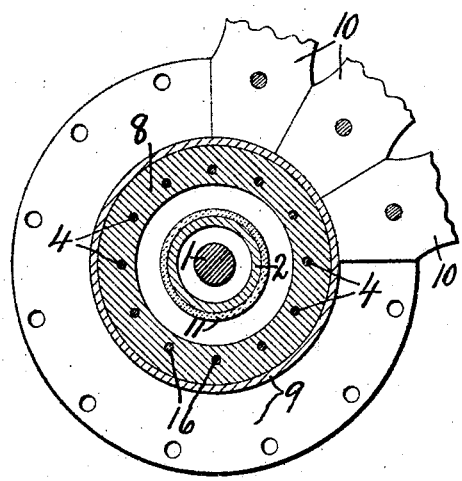
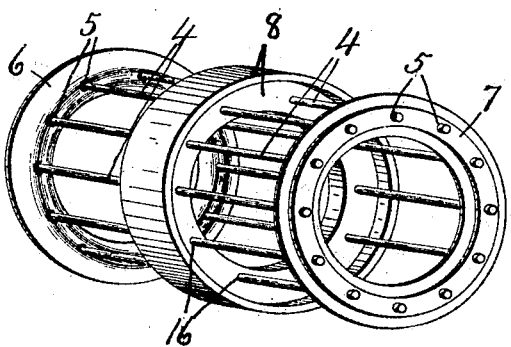
WITNESSES:
INVENTORS
E. Schuyler and
J. A. Hyle
BY Howard P. Denison
ATTORNEY

UNITED STATES PATENT OFFICE.

EDWARD SCHUYLER AND JOHN A. HYLE, OF SYRACUSE, NEW YORK, ASSIGNORS, BY DIRECT AND MESNE ASSIGNMENTS, OF ONE-THIRD TO SAID SCHUYLER, THIRTEEN FORTY-EIGHTHS TO SAID HYLE, THIRTEEN FORTY-EIGHTHS TO WILLIAM A. HYLE, OF SYRACUSE, NEW YORK, AND ONE-EIGHTH TO GEORGE C. HYLE, OF SYRACUSE, NEW YORK.

VEHICLE-WHEEL.

No. 864,110.   Specification of Letters Patent.   Patented Aug. 20, 1907.

Application filed May 14, 1906. Serial No. 316,744.

*To all whom it may concern:*

Be it known that we, EDWARD SCHUYLER and JOHN A. HYLE, of Syracuse, in the county of Onondaga, in the State of New York, have invented new and useful Improvements in Vehicle-Wheels, of which the following, taken in connection with the accompanying drawings, is a full, clear, and exact description.

This invention relates to certain improvements in vehicle wheels, and particularly to that class commonly used for self-propelled vehicles, in which a more or less yielding radial action with reference to the axle of the wheel is desirable to relieve the machine of much of the incidental shock and vibration in passing over uneven pavements or obstructions.

The main object, however, is to afford a practical and comparatively inexpensive substitute for pneumatic tires, cushion rims, and similar yielding mediums between the tread of the tire and axle, whereby we are enabled to use any form of solid rubber or other tire, as well as any form of rim without alteration. In other words, we have sought to sustain the rim of any vehicle wheel upon a suitable spring cage wholly within the hub of said wheel so that the radial resiliency is localized within the hub in such manner that when the wheel is free from radial pressure it will always assume a concentric position with reference to the axle, and at the same time, when subjected to load, the resiliency is distributed evenly around the entire axle. In carrying out this object it becomes necessary to make the hub of the wheel in sections, one movable radially with reference to the other, which, of course, tends to throw the wheel out of true.

A further object of our invention is to provide means to obviate this tendency, and to cause the outer section of the hub and rim of the wheel to always travel in the same radial plane with reference to the axle.

Other more specific objects and uses will be brought out in the following description.

In the drawings—Figure 1 is a longitudinal vertical sectional view through the hub of a vehicle wheel embodying the various features of our invention. Fig. 2 is a reduced transverse sectional view taken on line 2—2, Fig. 1. Fig. 3 is an isometric view of the detached spring cushion or yielding support for the radially movable section of the hub.

In demonstrating the practicability of our invention, we have shown a supporting axle, as —1—, for one of the steering wheels of a self-propelled vehicle, said wheel being provided with a central tubular hub —2— which is journaled upon the axle —1— through the medium of ball bearings —3—.

Surrounding the hub —2— is a circular row of parallel spring bars —4— spaced equidistant apart some distance from and concentric with the periphery of said hub and having their opposite ends seated or supported in suitable bearings —5— which are formed or mounted upon annular disks or heads —6— and —7— projecting from and rigid with the opposite ends of the hub —2—.

The bearings for the ends of the spring bars —4— are spaced a sufficient distance apart to allow a limited resilient or radial spring action of the centers of said bars upon which is mounted an annulus or ring —8— substantially midway between the bearings —5—, and therefore, centrally upon the spring bars for supporting an outer radially movable hub section —9— to which the spokes, as —10—, of the wheel, are secured.

The inner diameter of the ring or annulus —8— is somewhat greater than the outer diameter of the central portion of the hub —2— which it incloses to allow ample radial movement of the ring and hub-section —9— attached thereto against the action of the spring-bars —4—, the hub —2— being surrounded by a resilient, such as a rubber buffer —11—, which receives the impact of the inner face of the ring, and thereby limits the strain upon the spring-bars —4— should the wheel be subjected to excessive radial compression, as for instance, in encountering an obstruction or passing over extremely uneven pavements.

The flange —6— may be rigidly secured in any desired manner to or formed integral with the inner end of the hub —2—, but is preferably made in the form of a ring and secured by brazing or other fastening means, to the hub.

The opposite spring supporting ring or flange —7— is preferably screwed upon the outer end of the hub —2—, as shown in Fig. 1, and is held in place by a lock nut —12— and a cap 13— which latter closes the outer end of the hub to conceal the axle and prevent the entrance of dust to the bearings.

The bearings —5— on the inner flange —6— preferably consist of a circular series of sockets arranged concentrically around the axle —1— and in which the adjacent ends of the spring-bars —4— are loosely seated, said sockets or seats being of sufficient depth axially to the hub to prevent displacement of the adjacent ends of the spring-bars therefrom during the action of the springs under load.

The opposite or outer bearings —5— preferably consist of a circular series of apertures extending through the flanges —7— and arranged concentrically around the axle —1— to permit any of the spring bars to be quickly and easily withdrawn, and new ones inserted (should any of them become broken or otherwise impaired) by simply removing the outer end or cap, as 14—, of the outer hub-section —9— and similarly removing a washer-abutment 15— which is interposed between the cap —14— and flange —7— and abuts against the adjacent ends of the spring-bars —4— to hold the latter against undue endwise movement when mounted in the hub.

The spring bars —4— are passed through apertures —16— in the web of the annulus —8—, which not only serves as a spacer to keep the ends of the bars a uniform distance apart and in direct line with their ends, but also serves to distribute the load evenly to all of said spring bars so that any pressure tending to move the axle or outer hub section radially in one direction, is resisted by all of the spring-bars —4—, thereby enabling us to use comparatively light wire springs.

In order that the wheel may be able to run true upon its bearings the ends of the outer hub section —9— are made to lap upon the sides of the flanges —6— and —7—, thereby forming opposite end thrust bearings of sufficient radial depth to permit the maximum radial movement of the inner and outer hub sections, one upon the other, without disengagement of said bearings, leaving sufficient radial clearance between the inner and outer hub sections to permit the maximum radial movement of one of the sections upon the other as the spring-bars are flexed under load while the vehicle is under motion.

The essential feature of this invention thus far described consists broadly in interposing a circular row of spring-bars between the inner and outer hub sections which are movable radially relatively to each other against the action of said spring bars which are supported at their ends in one of the hub sections and support at the centers the other hub section, and by making these spring-bars straight from end to end and parallel concentrically with the axis of revolution, the hub section which is supported by the springs is also supported when not under load concentrically with the axle upon which the hub is mounted.

The center ring or annulus —8— is rigidly secured to the outer hub section —9— and co-acts with the spring-bars —4— to lock the hub sections —2— and —9— to rotate together, although in some instances, as in heavy traction wheels, I may prefer to provide the overlapping ends of the section —9— and flanges —6— and —7— with radial shoulders having sliding interlocking engagement to prevent undue strain of the spring bars should the vehicle be suddenly started or stopped.

What we claim:

1. In a vehicle wheel, an axle, straight spring bars arranged concentrically around and parallel with the axle some distance therefrom, means for supporting portions of the spring-bars a predetermined fixed distance from the axle, and a hub section mounted and movable radially against the action of said spring-bars.

2. In a vehicle wheel, an axle and a hub section, one of the parts being movable radially relatively to the other, a circular series of straight springs supported at their ends upon one of the parts and their central portions supporting the other part.

3. In a vehicle wheel, an axle, and a hub-section surrounding said axle, one of the parts being movable radially relatively to the other, a circular row of straight parallel spring bars arranged concentrically around and lengthwise to the axle, and supported by one of said parts and supporting the other part.

4. In a vehicle wheel, an axle and a hub section, one of the parts being movable radially relatively to the other, a series of straight spring bars arranged around the axle some distance therefrom and having both ends supported by one of the parts and their intermediate portions supporting the other part.

5. In a vehicle wheel, inner and outer hub sections, one being movable radially relatively to the other, straight parallel spring-bars of uniform diameter from end to end having their ends supported on one section and their intermediate portions supporting the other section.

6. In a vehicle hub, two hub sections having end flanges sliding radially one upon the other, one of said sections being movable radially relatively to the other, straight spring bars supported at their ends upon the flanges of one of the sections and having their intermediate portions supporting the other section.

7. In a vehicle wheel, inner and outer hub sections, straight spring-bars arranged around the inner section, opposite end flanges on one section having bearings for the ends of the bars, the other section being provided with apertures receiving the intermediate portions of said bars.

8. In a vehicle wheel, two rings, spaced apart, a concentric row of straight spring-bars having their ends seated in said rings, and an additional ring having apertures receiving the intermediate portions of said spring-bars, a hub section engaging the first named rings, and an additional hub section engaging the additional ring.

9. In a vehicle wheel, two hub sections, one being movable radially relatively to the other, said sections having end flanges slidable radially upon each other to hold them against relative endwise movement, and straight springs interposed between the hub sections and having their ends supported in the flanges of one section and their intermediate portions supporting the other section to hold said sections apart from each other.

10. In a vehicle wheel, two hub sections having radial sliding engagement with each other, a washer interposed between the meeting faces at one end of the hub sections, parallel spring bars supported at their ends on the inner hub section, and a ring secured by the intermediate portions of the spring bars and supporting the outer hub section.

11. In a vehicle wheel, an inner hub, and a yielding buffer encircling the same in combination with a series of spring bars arranged concentrically around said hub and buffer, said hub having opposite end flanges in which the ends of the bars are supported, and an outer hub section secured by the central portions of said bars.

12. In a vehicle wheel, an inner hub, and a yielding buffer encircling the same in combination with a series of spring bars arranged concentrically around said hub and buffer, said hub having opposite end flanges in which the ends of the bars are supported, and an outer hub section secured by the central portions of said bars and having radially sliding engagement with the flanges of the first named hub, and a washer interposed between one of the flanges and the adjacent portion of the outer hub in sliding engagement therewith.

In witness whereof we have hereunto set our hand this 5th day of May 1906.

EDWARD SCHUYLER.
JOHN A. HYLE.

Witnesses:
HOWARD P. DENISON,
MILDRED M. NOTT.